J. ALLGAIER.
Velocipede.
No. 100,097.
Patented Feb. 22, 1870.
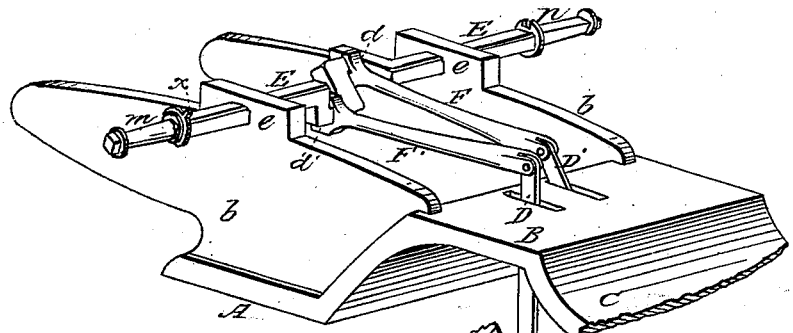
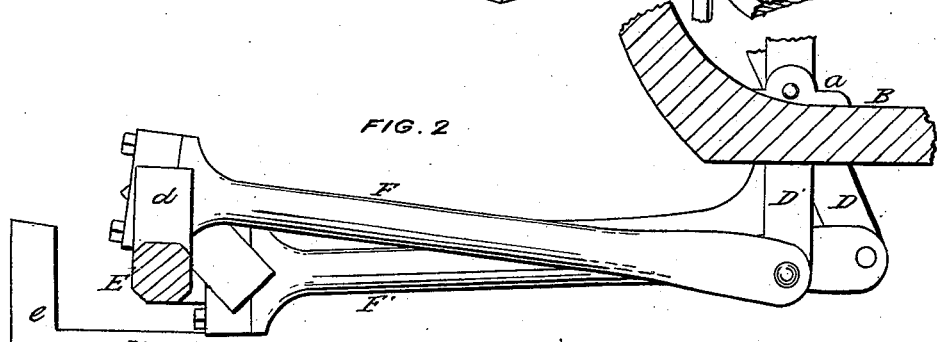
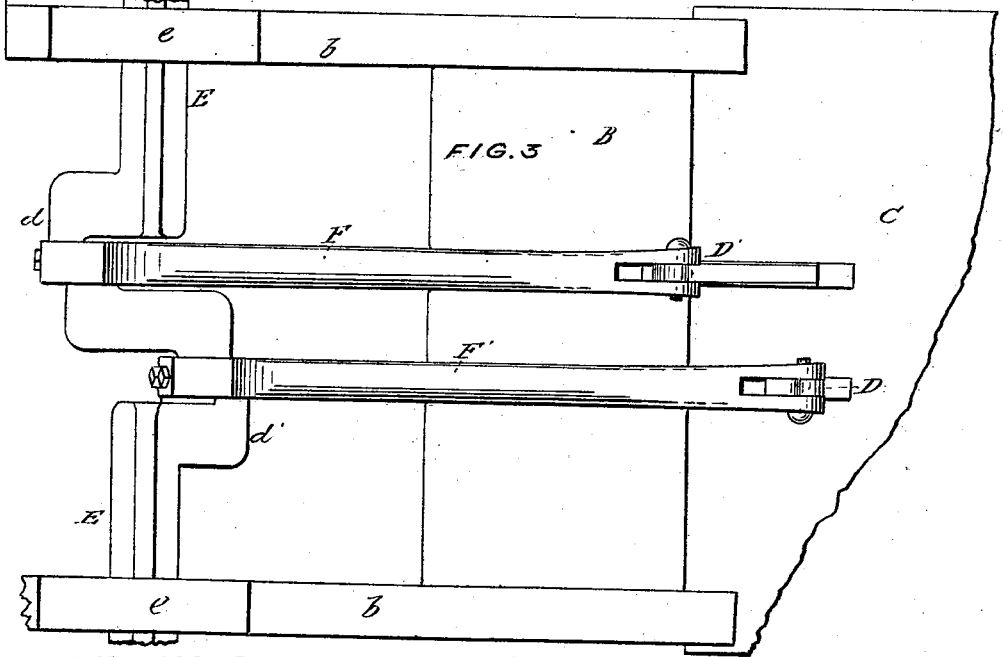

United States Patent Office.

JOHN ALLGAIER, OF PHILADELPHIA, PENNSYLVANIA.

Letters Patent No. 100,097, dated February 22, 1870.

IMPROVEMENT IN HAND-MOTIVE CARRIAGES.

The Schedule referred to in these Letters Patent and making part of the same.

I, JOHN ALLGAIER, of Philadelphia, county of Philadelphia, State of Pennsylvania, have invented an Improvement in Hand-Motive Carriages, of which the following is a specification.

Nature and Object of the Invention.

My invention relates to improvements in the hand-motive carriage for which Letters Patent were granted to me on the 11th day of May, 1869, and my present improvements consist of a certain arrangement of mechanism, described hereafter, for driving the rear axle by means of levers to be manipulated by an operator in the carriage.

My invention further consists of an axle having at one end a permanent or fixed driving-wheel, and at the opposite end a wheel which, during the turning of the carriage, is temporarily loose on the axle and therefore facilitates the turning, the said wheel, however, being a driving-wheel when the carriage is pursuing a direct course.

Description of the Accompanying Drawing.

Figure 1 is an inverted perspective view of part of a carriage with my improved driving-mechanism;

Figure 2, a sectional elevation of part of the carriage with driving-gear, all drawn to an enlarged scale; and Figure 3, an inverted plan view of fig. 2.

General Description.

As the present invention relates to improvements in the carriage for which Letters Patent were granted to me on the 11th day of May, 1869, sufficient only has been shown to illustrate my present invention.

In my said patent the rear axle was driven by an endless chain passing over a pulley on a spindle, provided with handles under the control of the operator. In the present instance the rear axle is driven by means of levers and rods coupled to cranks on the axle.

A represents the seat of the carriage;

B, the bottom of the same; and

C, the foot-board.

Two levers, D and D', are hung to pins on suitable plates $a$, secured to the bottom of the carriage through which the short arms of the levers project, the long arms of the levers extending so far above the said bottom as to be conveniently manipulated by the operator on the seat.

In some cases, where the springs are arranged entirely beneath the carriage, the levers can be secured to the under instead of the upper side of the bottom-board B, this permitting the length of the operating-arms to be increased and an increased leverage to be consequently gained.

In suitable bearings $e\ e$ on the frames $b\ b$ of the carriage, turns the rear axle E, on which, midway between its opposite ends, are formed two cranks, $d$ and $d'$, the latter being connected by a rod, F', to the lever D, and the crank $d$, by a rod, F, to the lever D', and the two cranks being arranged at such an angle in respect to each other that the movement of the levers D and D', demanded for turning the axle, will be most convenient for the operator in manipulating the said levers, one of which he grasps in each hand.

Thus, before one lever has reached the limit of its forward movement, and before its crank arrives at the "dead-center," the other lever must have commenced its rearward movement, this arrangement of the cranks being the best for enabling the operator to produce the desired results with the least muscular exertion.

It will be observed that with the exception of the long arms of the levers, all the driving mechanism is beneath the seat, and cannot in any way interfere with the convenience of the operator.

It will also be observed that one end, $m$, of the axle E is round and the other end square, the hub of one wheel being so fitted to this square end of the axle that it cannot turn independently of the same, and is therefore always a fixed driving-wheel.

The opposite wheel is fitted loosely to the round end $m$ of the axle, but has on its hub a projection against which a projection, $x$, on the axle can catch.

When the carriage takes a sharp turn the wheel on the round end of the axle will be temporarily loose thereon, and this will facilitate the turning of the carriage, but when the carriage is pursuing a straight course the projection $x$ will catch the projection of the wheel, which will then become a driving-wheel.

This arrangement was adopted at both ends of the axle in my former patent, and is there described in full, but in the present instance I prefer to apply it to one end only of the axle, the other end having a permanent driving-wheel.

Claims.

1. The cranked axle E, having one end round and a projection to catch against the hub of the wheel, and the other end square, so as to receive a permanent driving-wheel, as set forth.

2. The combination of the levers D D', arranged on a carriage as specified, the rods F F and crank-axle E having one end round and the other end square, and provided with a projection to catch against the hub of the wheel, as described.

In testimony whereof I have signed my name to this specification in the presence of two subscribing witnesses.

JOHN ALLGAIER.

Witnesses:
 WM. A. STEEL,
 HARRY SMITH.